(12) United States Patent
Wylie et al.

(10) Patent No.: US 8,677,208 B2
(45) Date of Patent: Mar. 18, 2014

(54) GENERATING A PARALLEL RECOVERY PLAN FOR A DATA STORAGE SYSTEM

(75) Inventors: John J. Wylie, San Francisco, CA (US); Kevin M. Greenan, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 764 days.

(21) Appl. No.: 12/679,449

(22) PCT Filed: Sep. 19, 2008

(86) PCT No.: PCT/US2008/076949
§ 371 (c)(1),
(2), (4) Date: Mar. 22, 2010

(87) PCT Pub. No.: WO2009/039336
PCT Pub. Date: Mar. 26, 2009

(65) Prior Publication Data
US 2010/0235677 A1 Sep. 16, 2010

Related U.S. Application Data

(60) Provisional application No. 60/994,885, filed on Sep. 21, 2007.

(51) Int. Cl.
*H03M 13/05* (2006.01)
(52) U.S. Cl.
USPC ............ 714/756; 714/757; 714/800; 714/804
(58) Field of Classification Search
USPC .......... 714/763, 764, 757, 799, 800, 802, 804
See application file for complete search history.

(56) References Cited

U.S. PATENT DOCUMENTS

| 5,379,162 | A | 1/1995 | Cunningham et al. |
|---|---|---|---|
| 6,038,679 | A | 3/2000 | Hanson |
| 6,332,206 | B1 * | 12/2001 | Nakatsuji et al. ............. 714/755 |
| 6,379,162 | B1 | 4/2002 | Raypole |
| 7,159,150 | B2 | 1/2007 | Kenchammana-Hosekote |
| 7,386,752 | B1 * | 6/2008 | Rakic et al. ....................... 714/2 |
| 7,577,866 | B1 * | 8/2009 | Fan et al. ..................... 714/6.24 |
| 7,676,735 | B2 * | 3/2010 | Luby et al. ..................... 714/781 |
| 7,984,361 | B2 * | 7/2011 | Ito ................................. 714/770 |
| 8,010,874 | B2 * | 8/2011 | Corbett et al. ................ 714/770 |
| 2006/0107091 | A1 * | 5/2006 | Hafner et al. ..................... 714/5 |

FOREIGN PATENT DOCUMENTS

| EP | 016967 | 7/2000 |
|---|---|---|
| WO | WO-01/31447 | 5/2001 |

OTHER PUBLICATIONS

European Search Report ~ Application No. 08831712.8-1225 dated Aug. 20, 2012 ~ 7 pages.

* cited by examiner

*Primary Examiner* — Joseph Schell (57) ABSTRACT

A method of identifying a parallel recovery plan for a data storage system comprises identifying base recovery plans for symbols of an erasure code implemented across a plurality of storage devices in a data storage system, generating a list of first recovery plans for a first symbol by manipulating the base recovery plans, and combining selected first recovery plans from the list to generate a set of parallel recovery plans to reconstruct a failed storage device.

14 Claims, 6 Drawing Sheets

GENERATING A PARALLEL RECOVERY PLAN FOR A DATA STORAGE SYSTEM

CROSS-REFERENCE TO RELATED APPLICATION

The present application claims priority to the U.S. Provisional Application Ser. No. 60/994,885, filed Sep. 21, 2007.

BACKGROUND

Network systems and storage devices need to reliably handle and store data and, thus, typically implement some type of scheme for recovering data that has been lost, degraded or otherwise compromised. At the most basic level, one recovery scheme could simply involve creating one or more complete copies or mirrors of the data being transferred or stored. Although such a recovery scheme may be relatively fault tolerant, it is not very efficient with respect to the need to duplicate storage space. Other recovery schemes involve performing a parity check. Thus, for instance, in a storage system having stored data distributed across multiple disks, one disk may be used solely for storing parity bits. While this type of recovery scheme requires less storage space than a mirroring scheme, it is not as fault tolerant, since any two device failures would result in an inability to recover any compromised data.

Thus, various recovery schemes have been developed with the goal of increasing efficiency (in terms of the amount of extra data generated) and fault tolerance (i.e., the extent to which the scheme can recover compromised data). These recovery schemes generally involve the creation of erasure codes that are adapted to generate and embed data redundancies within original data packets, thereby encoding the data packets in a prescribed manner. If such data packets become compromised, as may result from a disk or sector failure, for instance, such redundancies could enable recovery of the compromised data, or at least portions thereof. Various types of erasure codes are known, such as Reed-Solomon codes, RAID variants, array codes (e.g., EVENODD, RDP, etc.) and XOR-based erasure codes which enable recovery of data due to disk or sector failures.

While implementation of an erasure code enables recovery of compromised data, the time required to reconstruct a failed disk also affects both the reliability and performance of the storage system. During the time that a failed disk is being recovered, the system may continue to operate in the foreground in a degraded performance mode in which reads to available disks to rebuild the failed disk are rate limited. Recovery may be performed serially, where each of the disks in the storage system is read in its entirety to recover the lost data, but such a technique is time-consuming. Alternatively, failed disks may be recovered in parallel, which reduces reconstruction time. The faster the failed disk can be reconstructed, the more reliable the storage system will be and the less time the system operates in a degraded performance mode. However, the price paid for a faster recovery typically is worse degraded mode performance as a result of the load that is placed on the system due to recovery efforts. To counteract degraded performance, scheduling reads from each available disk can be performed to reduce the load on any one disk. Thus, parallel recovery schemes may be implemented to reduce the load placed on each available disk and/or increase the rate at which the failed disk is recovered.

DETAILED DESCRIPTION

Figure 1:
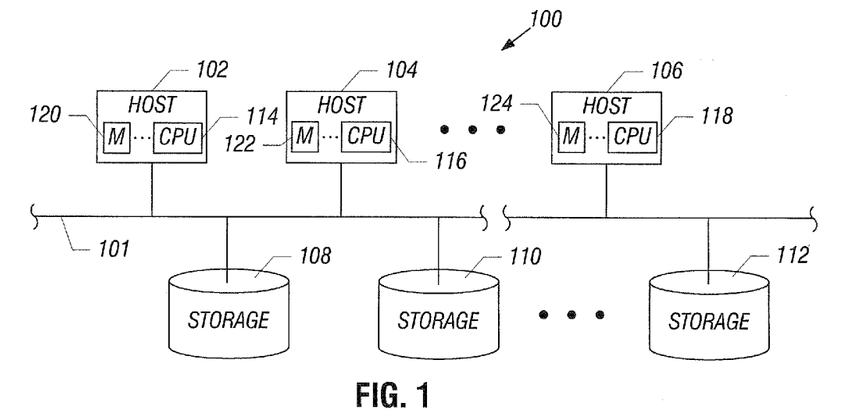
FIG. 1 illustrates a network of devices in accordance with an exemplary embodiment of the invention.

FIG. 1 illustrates an exemplary arrangement of a system of devices 100 which includes a plurality of computer hosts 102, 104, 106 and a plurality of storage devices 108, 110 and 112. In one embodiment, the hosts 102, 104, 106 and storage devices 108, 110 and 112 may be interconnected by a network 101. The network 101 may include, for example, a local area network (LAN), a wide area network (WAN), a storage area network (SAN), the Internet or any other type of communication link. In addition, the network 101 may include system buses or other fast interconnects. The system 100 shown in FIG. 1 may be any one of an application server farm, a storage server farm (or storage area network), a web server farm, a switch or router farm, etc. Although three hosts 102, 104, 106 and three storage devices 108, 110 and 112 are depicted in FIG. 1, it is understood that the system 100 may include more than three hosts and three storage devices, depending on the particular application in which the system 100 is employed. The hosts may be, for example, computers (e.g., application servers, storage servers, web servers, etc.), communications modules (e.g., switches, routers, etc.) and other types of machines. Although each of the hosts is depicted in FIG. 1 as being contained within a box, a particular host may be a distributed machine, which has multiple nodes that provide a distributed and parallel processing system.

The storage devices 108-112 are adapted to store data associated with the hosts 102-106. Each of the hosts 102-106 could be coupled to one or more of the storage devices 108-112, and each of the hosts 102-106 could access the storage devices 108-112 for storing and/or retrieving data from those devices. Each of the storage devices 108-112 could be an independent memory bank. Alternatively, the devices 108-112 could be interconnected, thus forming a large memory bank or a subcomplex of a large memory bank. The devices 108-112 may be, for example, magnetic memory devices, optical memory devices, flash memory devices, etc., depending on the particular implementation of system 100 in which the devices are deployed.

In an exemplary embodiment, an erasure code can be implemented across the plurality of hosts 102-106 and/or the plurality of storage devices 108-112 to enable recovery of data that has become damaged, lost or otherwise compromised during transferring, storing and/or retrieving operations implemented by the hosts 102-106 and/or the storage devices 108-112. Types of erasure codes include Maximum Distance Separable (MDS) codes and XOR-based codes. In general, both MDS and XOR-based erasure codes consist of n symbols, k of which are data symbols and m of which are redundant (or parity) symbols. XOR-based erasure codes include parity check array codes, Simple Product Codes, Weaver codes, and flat codes. Parity check array codes place multiple symbols per disk in a strip. The strips from each disk together constitute a stripe. Examples of parity check array codes include EVENODD, Row-Diagonal Parity (RDP), and X-Code. EVENODD and RDP codes are horizontal codes—i.e., a strip contains either data or parity symbols, but not both). X-Code is a vertical code—i.e., every strip contains a similar number of data and parity symbols.

Simple Product Codes are horizontal vertical codes: some strips are akin to vertical code strips and other strips are akin to horizontal code strips. Weaver codes are vertical codes with a regular symmetric structure. Flat codes are horizontal XOR-based erasure codes with a single symbol per strip. To balance load due to parity updates among storage devices, horizontal and horizontal vertical codes can be rotated (i.e., the strips in each successive stripe, or set of stripes, are rotated to distribute the number of data and parity symbols evenly among the storage devices in the system). In the discussion below, a particular code will be referred to using the notation (k,m)-"type" code. For instance, a flat code with five data symbols and three parity symbols will be referred to as a (5,3)-flat code.

Figure 2:
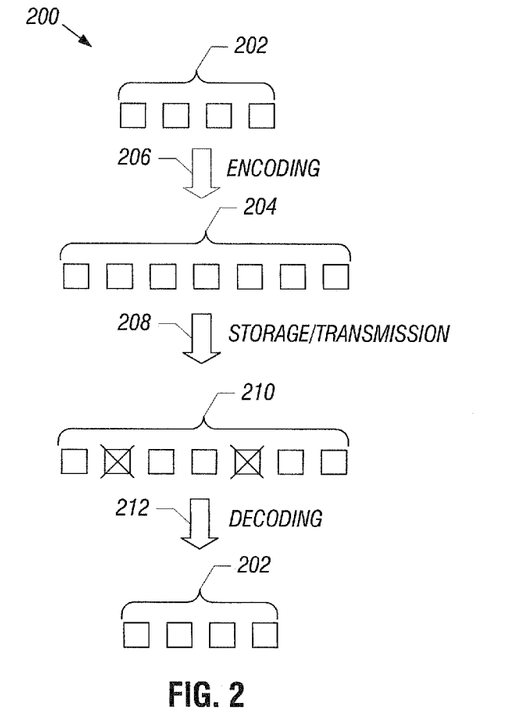
FIG. 2 illustrates encoding and decoding processes implemented by an erasure code in accordance with an exemplary embodiment of the invention.

FIG. 2 illustrates an erasure code encoding and decoding process 200 in accordance with an exemplary embodiment of the invention. The process 200 includes encoding and decoding steps performed by an erasure code for storing, retrieving and/or transferring data in the system 100. In accordance with one embodiment of the invention, the process 200 is implemented by an XOR-based code. As illustrated in FIG. 2, an initial data set 202 is provided, which includes a string of bits, bytes, or other symbols representing storable, retrievable and/or transferrable data or other information used by the system 100. The erasure code encodes the initial data set 202 into an encoded data set 204, as represented by the arrow 206. The arrow 206 represents the transformation process, which generally involves creating redundancies within the original data set 202, thereby increasing its size to form the encoded data set 204. The particular transformation process 206 employed is based on the erasure code used and the particular implementation of the system 100.

After encoding, the data set 204 may be stored, retrieved, and/or transferred, as indicated by the arrow 208. For instance, arrow 208 could correspond to transmitting the data set 204 between individual computers or to a user retrieving data from a server. Alternatively, arrow 208 could correspond to data transfer, storage and/or retrieval operations occurring between the multiple communication and/or storage devices of the system 100. During the processes represented by arrow 208, the data set 204 could, for example, propagate through lossy communication channels or be stored in corrupted storage devices. Thus, some portion of the data set 204 could become lost or otherwise compromised, resulting in a degraded data set 210. As illustrated in FIG. 2, the data set 210 includes erasures (represented by the crossed-out portions), corresponding to those portions of the data set 204 which have been lost during the process 208. Depending on the erasure code used and the portions of the data lost, the original data set 202 may be recoverable.

To recover the initial data set 202, a decoding process (represented by arrow 212) is applied to the degraded data set 210. Again, the particular decoding process employed depends on the structure of the erasure code being implemented. As the ability to recover the data depends on the erasure code used and which portions of the encoded data set 204 were lost (i.e., the erasures), it may be possible that the initial data set 202 may not be recovered in some instances.

As will be described below, an exemplary embodiment of the invention provides a technique for recovering data lost due to a failure of one or more storage devices. Although the technique will be described with respect to a non-MDS XOR-based code, it should be understood that the recovery scheme is applicable to other types of erasure codes, including MDS codes. The technique includes enumerating recovery plans for each symbol on each storage device in the system and then determining a parallel recovery plan to reconstruct one or more failed storage devices. As used herein, a recovery plan is a plan responsible for recovering lost symbols within a particular strip. A parallel recovery plan is a list of recovery plans that may be executed in parallel to reconstruct a failed storage device. Each recovery plan in a parallel plan is responsible for recovering lost symbols from a different set of storage devices. The parallel plan affects both the "speedup" of recovery and the "load" on the system during recovery. As used herein, "speedup" is the ratio of the recovery rate of the parallel plan to an individual recovery plan (i.e., a recovery plan in which some number of disks must be read in their entirety to recover a failed disk). "Load," as used herein, is the number of disks worth of data that must be read to reconstruct the failed disk. A parallel plan may be selected based on a desired performance metric, such as achieving a balance of maximum speedup and minimal load during recovery. Alternatively, selection of the parallel plan may be weighted more toward maximum speedup or more towards minimal load.

The particular recovery scheme that enables reconstruction of a failed device depends on the structure of the erasure code that is implemented in the system. Such a structure may be defined by either a generator matrix or a Tanner graph. As known in the art, a generator matrix of a (k, m)-code is a k×(k+m) matrix in a Galois field of two elements. Addition of rows and columns in the generator matrix is done modulo 2, that is, in accordance with the XOR operation. The generator matrix consists of a k×k data submatrix and m columns of dimension k×1 appended to the data submatrix as a parity submatrix. Each of the m columns of the data submatrix corresponds to a stored data symbol. Likewise, each of the m columns in the parity submatrix corresponds to a stored parity symbol. A parity column p has a "1" in row i if and only if data symbol si is XOR'ed to determine p. For example, if p=s2 XOR s4, the parity column p has a "1" in rows 2 and 4 and a "0" in all other rows. For example, one possible generator matrix for a (5,3)-flat code is set forth below.

$$\begin{matrix} s_0 & s_1 & s_2 & s_3 & s_4 & s_5 & s_6 & s_7 \end{matrix}$$
$$\begin{bmatrix} 1 & 0 & 0 & 0 & 0 & 1 & 1 & 1 \\ 0 & 1 & 0 & 0 & 0 & 1 & 1 & 0 \\ 0 & 0 & 1 & 0 & 0 & 1 & 0 & 1 \\ 0 & 0 & 0 & 1 & 0 & 0 & 1 & 1 \\ 0 & 0 & 0 & 0 & 1 & 0 & 0 & 1 \end{bmatrix}$$

Figure 3:
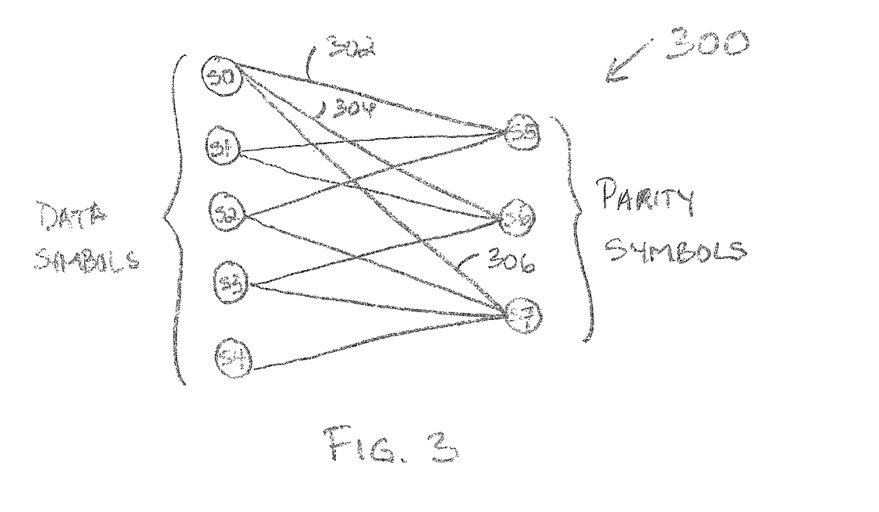
FIG. 3 is a Tanner graph representing an erasure code in accordance with an exemplary embodiment of the invention.

The structure of the (5,3)-flat code also may be represented by a Tanner graph. A Tanner graph is a bipartite graph with k data nodes on one side, m parity symbols on the other side, and a plurality of edges interconnecting the data symbols and parity symbols in accordance with the structure of the erasure code. A Tanner graph 300 that represents the structure of the erasure code described by the above generator matrix is illustrated in FIG. 3.

Generally, each symbol on a failed storage device may be recovered in accordance with one or more recovery plans that depend on the structure of the erasure code. In the simplest sense, for XOR-based erasure codes, an algorithm to determine the recovery plans of each symbol on each storage device is to test the XOR of all combinations of symbols in the code. Any combination of symbols whose XOR yields the symbol in question is a recovery plan for that symbol. Such a brute force algorithm is not very efficient, however, since it considers $2^{k+m-1}$ combinations of symbols and may produce some recovery plans that depend on more storage devices than necessary.

Figure 4:
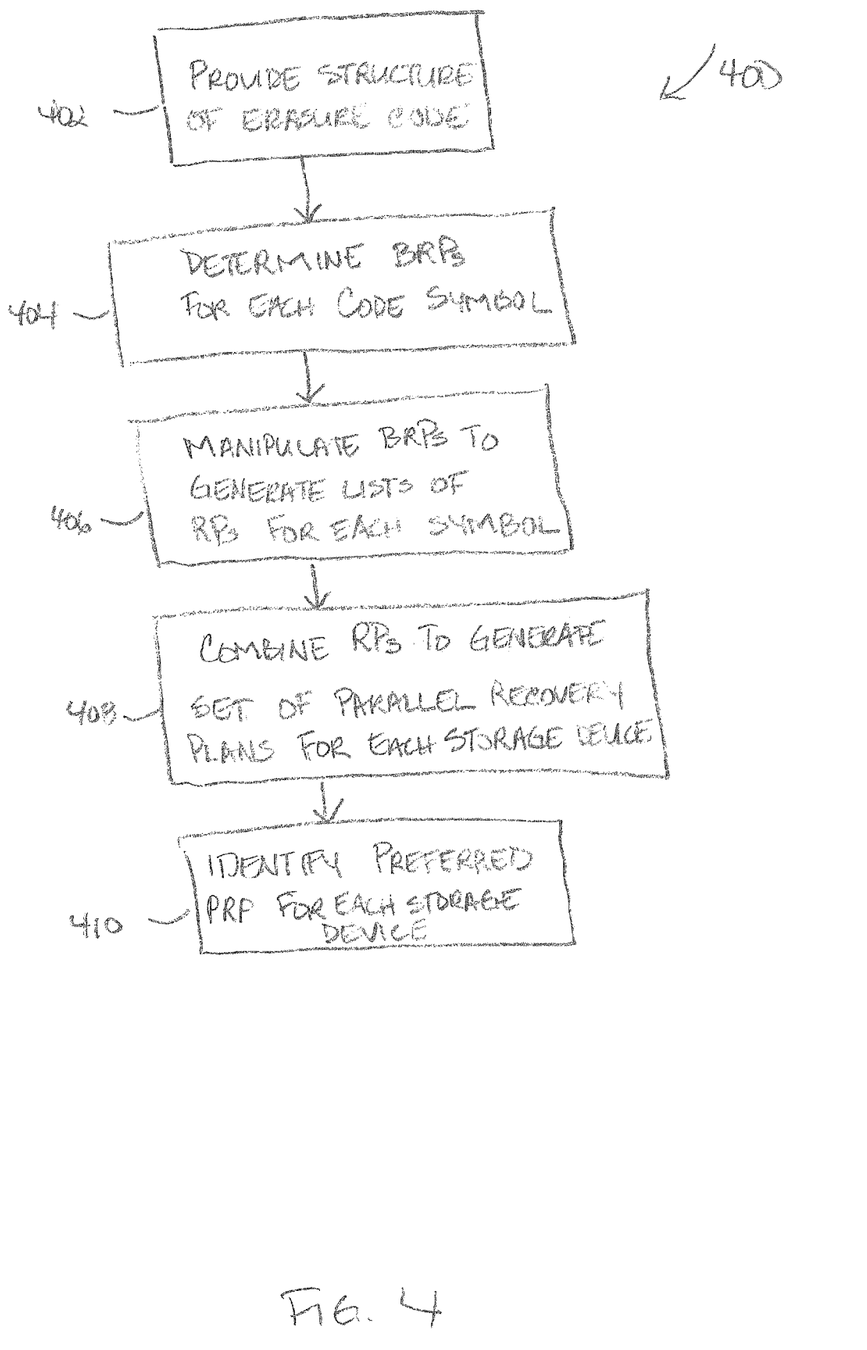
FIG. 4 is a flow diagram of a technique for generating a parallel recovery plan to recover data lost in a storage system.

Referring to the flow diagram in FIG. 4, a more efficient algorithm 400 to yield the recovery plans for each symbol on a disk uses the structure of the erasure code as defined, for instance, by the generator matrix or the Tanner graph for the code (step 402). The recovery plans (RPs) produced for each symbol of the code in this manner are referred to as base recovery plans (BRPs) (step 404). In accordance with an embodiment of the invention, the base recovery plans for each symbol may then be manipulated to yield a list of all recovery plans for each symbol of the code (step 406). The recovery plan lists for all symbols may then be considered in combination to generate a set of possible parallel recovery plans for reconstructing a failed storage device (step 408). The set of possible plans may then be evaluated to identify a preferred parallel recovery plan for reconstructing each storage device based on a selected performance metric (step 410). Pseudo-code for exemplary recovery plan and parallel recovery plan algorithms to produce a list of parallel recovery plans and identify a preferred plan in this manner is set forth in Table 1 below.

```
bas_rp(s):      /* Base recovery plans for data symbol s. */
100:              rp_base_lst[δ] ← [ ]
101:              for all (odd_set ∈ odd_sets[s]) do
102:                nxt_rp ← ( )
103:                for all (p ∈ odd_set) do
104:                  nxt_rp ← nxt_rp ⊕ bitmap (p, s)
105:                rp_base_lst[s] ← rp_base_lst[s] | nxt_rp|
106:              return (rp_base_lst[s])
rp(s, rp_lst, rp_base_lst):   /* Recovery plans for symbol s. */
200:              for all (rp ∈ rp_lst) do
201:                for all (s' ∈ data_symbols(rp)) do
202:                  for all rp' ∈ cond_rp(rp_base_lst[s'],s)) do
203:                    nxt_rp ← rp ⊕ bitmap(rp', s') ⊕ s'
204:                    if (nxt_rp ∉ rp_lst) then
205:                      rp_lst ← [rp_lst | nxt_rp]
206:              return (rp_lst)
enum_rp( ):     /* Enumerate recovery plans */
300:              for 0 ≤ s < k do
301:                rp_base_lst[s] ← base_rp(s)
302:              ∀s ∈ (0,..., k - 1), rp_lsts[s] ← rp_base_lst[δ]
303:              ∀p ∈ (k,...,n - 1), rp_lsts[p] ← [bitmap(p)]
304:              for 0 ≤ s < n do
305:                rp_lsts[s] ← rp(s, rp_lst[s], rp_base_lst)
306:              return (rp_lsts)
enum_pp(pp_lst, pp, bst, index, rp_lst, b_bnd): /* Recurse! */
400:              for index ≤ t < |rp_lst| do
401:                nxt_hst ← hst; nxt_pp ← pp
402:                for all (s ∈ rp_lst[i]) do
403:                  nxt_hst[s] = nxt_hst[s] + 1
404:                  if (max(nxt_hst) ≤ b_bnd) then
405:                    nxt_pp ← [nxt_pp | rp_lst[i]]
406:                    ppl ← enum_pp(pp_lst, nxt_pp, nxt_hst,
407:                                  index + 1 rp_lst, b_bnd)
408:                    pp_lst ← [pp_lst | nxt_pp]
409:              return (pp_lst)
best_pp(rp_lst, max_b_bnd):  /* Find best parallel plans. */
500:              pp_lst ← [ ]
501:              for 1 ≤ b_bnd ≤ max_b_bnd do
502:                ∀i ∈ (1,...,n), hst[i] ← 0
503:                nxt_pp_lst ← enum_pp(pp_lst, [|, hst, O, rp_lst,
                                          b_bnd)]
504:                pp_lst ← [pp_lst | nxt_pp_lst]
505:              pp_lst ← most_parallel(pp_lst)
506:              pp_lst ← least_load(pp_lst)
507:              return (pp_lst)
```

The processes for generating base recovery plans for data symbols and for parity symbols of the erasure code are different, although both processes determine the base recovery plans based on the structure of the code as defined by either the generator matrix or the Tanner graph. In one embodiment, for instance, for a parity symbol, the base recovery plan is simply the parity equation rearranged to solve for the parity symbol, i.e., the column of the generator matrix that corresponds to the parity symbol is rearranged. There is exactly one base recovery plan for each parity symbol. Thus, for instance, with reference to the generator matrix for the (5,3)-flat code set forth above, the base recovery plan for parity symbol s5 is $$s5 = s0 \text{ XOR } s1 \text{ XOR } s2 \text{ (or } (0,1,2)) \tag{1}$$

For data symbols, the Tanner graph or the rows of the generator matrix may be used to determine the base recovery plans for each symbol. For instance, with reference to the recovery plan algorithm set forth in Table 1, the function base_rp enumerates the base recovery plans for a data symbol s in the erasure code. For each data symbol, s, there is a base recovery plan for each of the "odd sets" of parity symbols that depend on the data symbol. The odd sets of parity symbols may be determined from either the rows of the generator matrix or the Tanner graph corresponding to the erasure code. When referring to the Tanner graph 300, the odd sets are all sets of parity nodes of odd size to which the data symbol is connected. For instance, for the (5,3)-flat code set forth above, the Tanner graph 300 shows that data symbol s0 is connected to three parity symbols s5, s6, and s7 via edges 302, 304, and 306, respectively. Thus, symbol s0 has four odd sets of parity symbols. More specifically, there are three odd sets of size one (i.e., one set for each parity symbol s5, s6 and s7) and one odd set of size three (i.e., one set consisting of the three parity symbols s5, s6 and s7). Data symbol s4 has only one odd set of parity symbols because node s4 is connected only to parity symbol s7 via edge 308. Thus, the odd set is of size one and consists of parity symbol s7. The intuition behind odd sets is that the XOR of an odd number of base recovery plans due to a single parity is also a base recovery plan. Even sets do not yield recovery plans because they do not yield equations which can be solved for the missing symbol.

Referring again to the pseudo-code set forth in Table 1, the function bitmap (p,s) solves the parity equation of p for symbol s. For example, for the odd set of data symbol s0 comprised solely of p=s5, bitmap(5,0) returns 38, because $38 = 2^1 + 2^2 + 2^5$. The odd sets for symbol s0 may be easily seen with reference to the Tanner graph 300 in FIG. 3. In the Tanner graph 300, data symbol s0 is connected to parity symbols s5, s6, and s7. The first odd set consists of symbol s5, which is connected by edges to data symbols s0, s1, and s2. The second odd set consists of symbol s6, which is connected by edges to s0, s1, and s3. The third odd set consists of symbol s7, which is connected by edges to data symbols s0, s2, s3, and s4. Thus, the first three base recovery plans for symbol s0 are simple rearrangements of the parity equation for each of the parity symbols s5, s6, and s7, solved for the symbol s0. The fourth recovery plan based on the odd set of size three is the XOR of the three other base recovery plans.

Thus, the first three base recovery plans based on the odd sets of size one are:

$$s0=s1 \text{ XOR } s2 \text{ XOR } s5 \text{ (or } (1,2,5)) \quad (2)$$

$$s0=s1 \text{ XOR } s3 \text{ XOR } s6 \text{ (or } (1,3,6)) \quad (3)$$

$$s0=s2 \text{ XOR } s3 \text{ OR } s4 \text{ XOR } s7 \text{ (or } (2,3,4,7)) \quad (4)$$

The fourth base recovery plan based on the odd set of size three is:

$$s0=s4 \text{ XOR } s5 \text{ XOR } s6 \text{ XOR } s7 \text{ (or } (4,5,6,7)) \quad (5)$$

The base recovery plans for s0 are then manipulated to generate the list of recovery plans for s0. This is done, for instance, by using the function enum_rp in Table 1 and as set forth in the flow diagram of an exemplary recovery plan algorithm 500 in FIG. 5. In accordance with this algorithm, for each symbol s (either data or parity symbols), the list of recovery plans is initialized to its list of base recovery plans (step 502).

Figure 5:
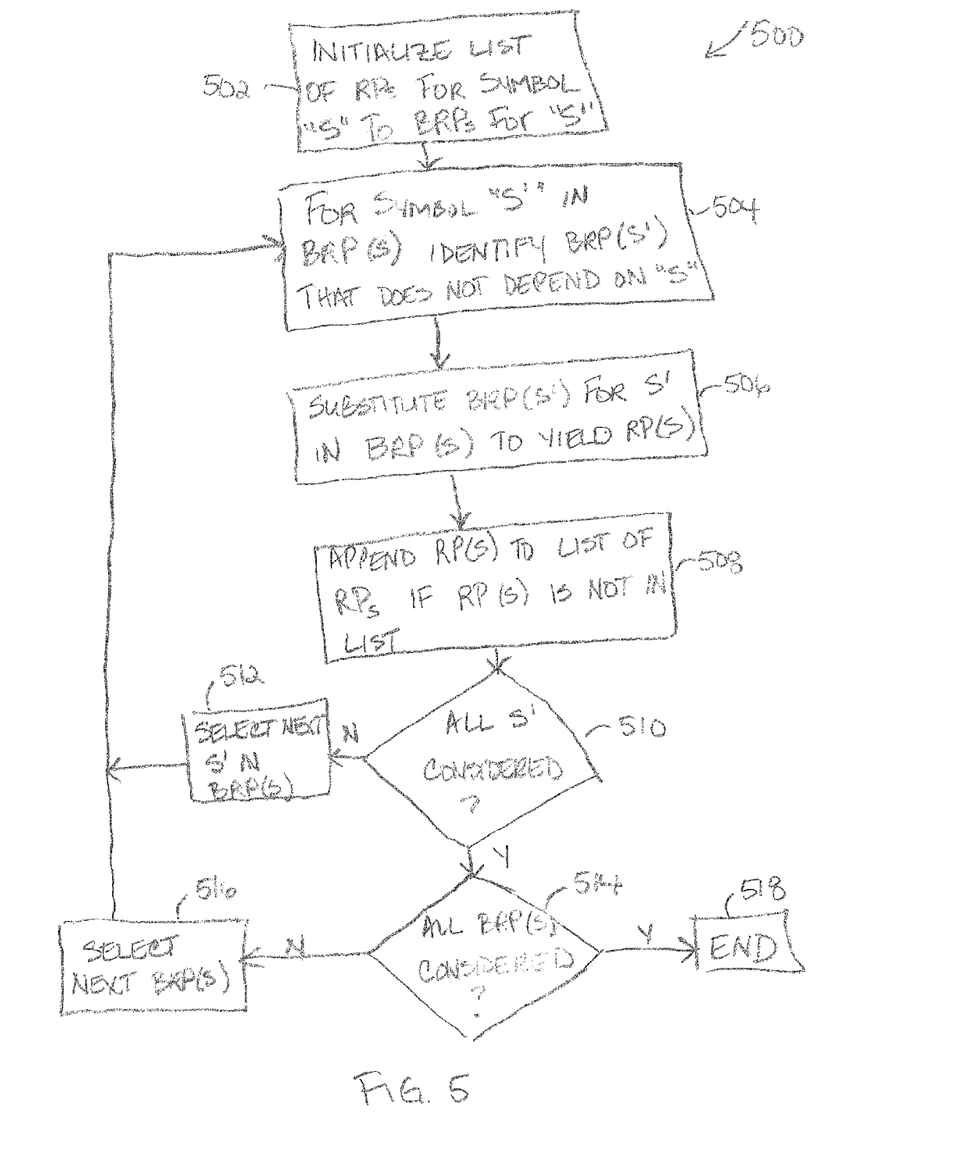
FIG. 5 is a flow diagram of a technique for generating a list of recovery plans for a symbol in an erasure code, in accordance with an exemplary embodiment of the invention.

The function rp enumerates the recovery plan for a specific symbol, given the base recovery plans for all symbols. Function rp processes the initial list of base recovery plans in order, and appends additional recovery plans to the list as they are found. To process a recovery plan rp from the list, for each data symbol s' in the base recovery plan BRP(s), the set of base recovery plans for s' (BRP(s')) that do not depend upon s are identified (step 504). The function cond_rp determines such a conditional set of base recovery plans. For each base recovery plan BRP(s') in the conditional set of base recovery plans, the base recovery plan BRP(s') is substituted for s' in the base recovery plan BRP(s) and the XOR is taken (step 506). If the resulting recovery plan is not already in the list of base recovery plans for s, then the resulting recovery plan is appended to the recovery plan list for s (step 508). In some embodiments of the invention, a dictionary of recovery plans may be maintained for each data symbol s to ensure that each recovery plan appended to the initial list is unique. This process repeats for each symbol s' in the base recovery plan BRP(s) until all symbols s' have been considered and substituted (steps 510 and 512). Once all symbols s' in BRP(s) have been considered, the next BRP for symbol s is manipulated (steps 514 and 516).

To illustrate, consider the data symbol s0 in the (5,3)-flat code set forth above. The list of recovery plans for s=s0 is initialized to the list of four base recovery plans for s0. The first recovery plan thus processed by function rp is (1, 2, 5). The first data symbol processed in this recovery plan is s1. The first base recovery plan for s' that does not depend on data symbol s0 is (3, 4, 5, 7). Substituting (3, 4, 5, 7) for symbol s1 in recovery plan (1, 2, 5) and taking the XOR yields a conditional recovery plan (2, 3, 4, 7). Since (2, 3, 4, 7) is already in the list of base recovery plans for data symbol s0, the conditional recovery plan is not appended to the list of recovery plan for symbol s0. As this process is repeated for each symbol in the recovery plans for s0, it is found, in this instance, that the list of recovery plans for symbol s0 is simply the list of base recovery plan for s0.

Once the lists of recovery plans for symbols in the erasure code are generated, parallel recovery plans to reconstruct a failed storage device may be determined. While many parallel recovery plans are possible, various performance metrics may be used to determine a preferred parallel recovery plan.

In one embodiment, the metrics are maximum speedup with minimal load. Thus, using the metric as the guideline, the preferred parallel recovery plan yields a schedule of the set of recovery plans to perform in parallel that offers maximum speedup with minimal load. Other types of performance metrics for selecting a preferred parallel recovery plan also are contemplated. For instance, a bound on the amount of data that must be read from the busiest storage device in a parallel recovery plan (referred to as the "bottleneck disk-load") also may be considered. Fault tolerance and reliability of a parallel recovery plan also may be performance metrics that may be used to selected a preferred parallel plan.

In the simplest sense, the preferred parallel recovery plan may be determined by evaluating all possible combinations of recovery plans that can reconstruct a failed disk. However, as the number of recovery plans for a code can be quite large, determination of a parallel recovery plan in this manner is not efficient. Thus, in some embodiments of the invention, the recovery plan algorithm may reduce the number of recovery plans considered by filtering the recovery plans added to the list based on some specified bound, such as the weight of the recovery plan (i.e., the recovery plan algorithm filters out high weight plans that depend on a number of symbols that exceeds a predefined threshold).

Given lists of recovery plans for the symbols, the parallel recovery plan algorithm may be used to determine all parallel recovery plans for a failed storage device. Again, in the simplest sense, the parallel recovery plan algorithm may consider all recovery plans for each symbol s and determine a powerset P of all possible recovery plan combinations, where each element p in powerset P is a parallel recovery plan. The parallel recovery plan algorithm may then evaluate each element p based on a desired performance metric, such as speedup and load. Speedup is defined as the number of recovery plans in parallel plan p divided by the maximal number of recovery plans in p in which any one symbol occurs. Load is defined as the total number of disks worth of data that will be read in parallel plan p, which is calculated by taking the aggregate number of symbols used over every recovery plan in p, divided by the number of recovery plans in p.

In accordance with one embodiment of the invention, the number of combinations of recovery plans that are evaluated by the parallel recovery plan algorithm for speedup and load may be reduced by filtering out parallel plans p in the powerset P for which the maximal number of recovery plans in p in which any one symbol occurs is bound by a constant. This constant is referred to as a bottleneck bound. The bottleneck bound is effective at filtering out parallel plans since the speedup metric is the number of recovery plans in the parallel plan divided by the maximum number of recovery plans in which any one symbol participates. For example, if the bottleneck bound is "one," then only disjoint recovery plans are included in the parallel plan. Thus, in this example, the speedup is simply the number of recovery plans that comprise the parallel plan.

Referring again to the pseudo-code in Table 1, given a list of recovery plans and a particular bottleneck bound, the function enum_pp enumerates the parallel plans recursively. In the first loop, the enum_pp function adds each recovery plan from the list to a parallel plan and then recurses. For the first recovery plan, the invocation of enum_pp leads to every other recovery plan (i.e., the second through the last plan) that may be added to the parallel plan without exceeding the bottleneck bound, thus producing a parallel plan (and further recursion). Recursion stops when the list of recovery plans is exhausted. In one embodiment, a histogram may be used to determine whether or not adding a recovery plan to the parallel plan exceeds the bottleneck bound.

To identify the best parallel plan, the parallel recovery plan algorithm calls enum_pp with successively larger bottleneck bounds until some maximum bottleneck bound is reached. As used herein, the "best" or "preferred" parallel plan is a plan that satisfies a desired performance metric. Thus, the "best" plan will vary depending on the metric selected. Also, multiple best or preferred plans may exist.

Regardless of the metric used, all the parallel plans produced by enum_pp are then evaluated to find those that satisfy the selected metric, such as first finding those with the maximum speedup and then those with the minimal load, for instance. In other embodiments, if the dominant metric is minimal load, then the priorities of the parallel plan algorithm can be defined to first consider minimal load and then maximum speedup. The function best_pp in Table 1 illustrates this process for a list of recovery plans for a single symbol. Given the best parallel plan for each symbol in the code, the parallel recovery plan algorithm then may calculate an average speedup and load over all symbols given that a single symbol has been erased. Calculating an average addresses the fact that erasure codes are often applied to stripes that are rotated.

Figure 6:
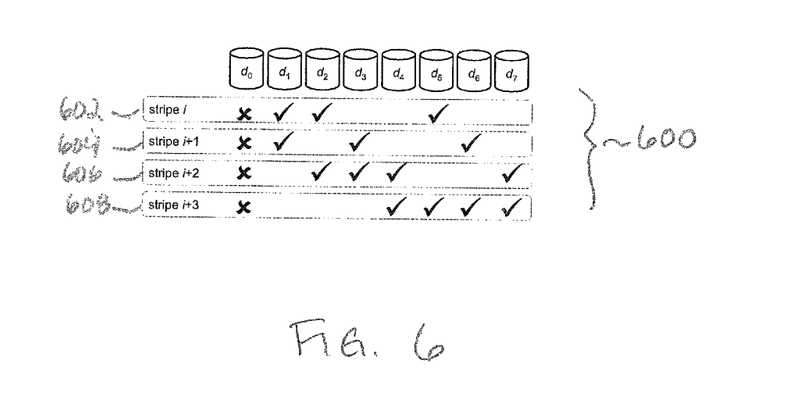
FIG. 6 illustrates an exemplary parallel recovery plan for a symbol in the (5,3)-flat code represented by the Tanner graph in FIG. 3, in accordance with an embodiment of the invention.

An example of a parallel plan 600 selected by the parallel recovery plan algorithm for a failed disk d0 is shown in FIG. 6. In FIG. 6, the (5,3)-flat code is implemented across eight disks, d0-d7. As discussed above, the list of recovery plans for symbol s0 is the list of base recovery plans for s0 on failed disk d0: [(1, 2, 5), (1, 3, 6), (2, 3, 4, 7), (4, 5, 6, 7)]. Recovery plan (1, 2, 5) recovers s0 on d0 on stripe 602; recovery plan (1, 36, 5) recovers s0 on d0 on stripe 604; recovery plan (2, 3, 4, 7) recovers s0 on d0 on stripe 606; and recovery plan (4, 5, 6, 7) recovers s0 on d0 on stripe 608. In the parallel plan 600 illustrated in FIG. 6, each disk is a bottleneck disk because each disk participates in two recovery plans. Thus, the best or preferred parallel plan schedules all four of the recovery plans. In this plan, the speedup is 2.0, which is determined by dividing the number of recovery plans scheduled in the parallel plan (i.e., 4) by the number of recovery plans in which each bottleneck disk participates (i.e., 2). The load for this parallel plan is 3.5, which is determined by dividing the total number of symbols in the constituent plan (i.e., 3+3+4+4) by the number of constituent recovery plans (i.e., 4). This means that 3.5 disks worth of data are required to recover lost disk d0 (i.e., half of each available disk is read during the rebuild of disk d0).

Figure 7:
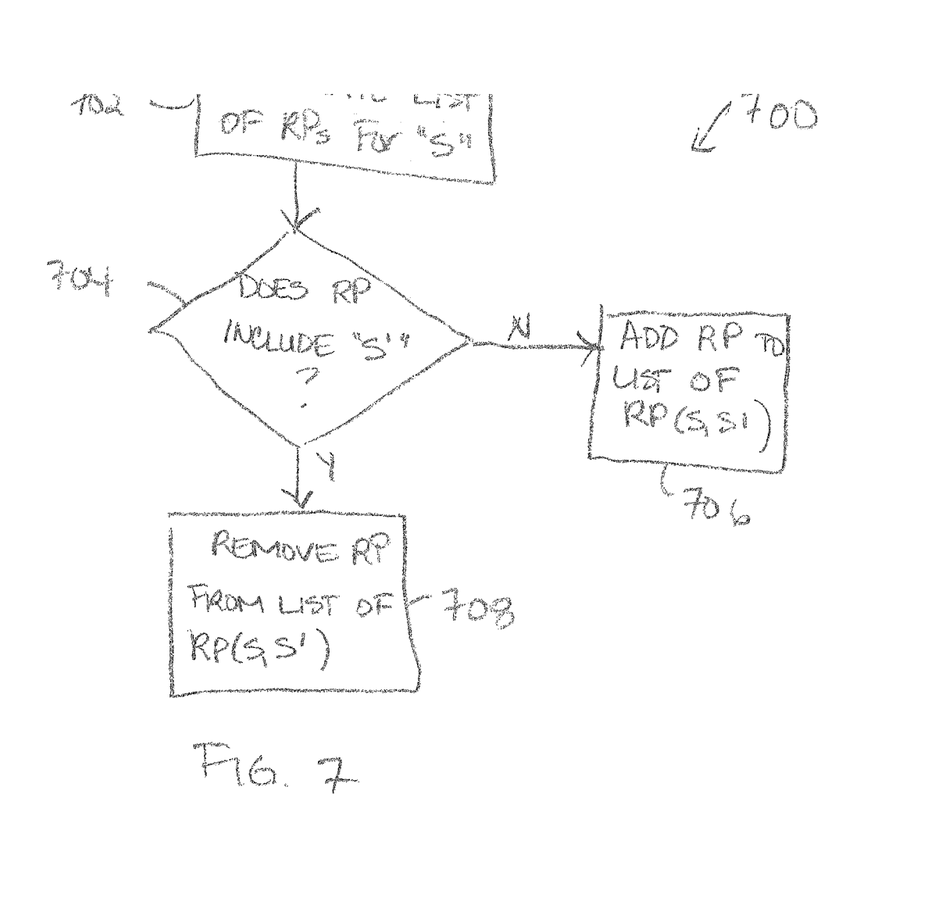
FIG. 7 is a flow diagram of a technique for generating a conditional parallel recovery plan for a symbol in an erasure code, in accordance with an exemplary embodiment of the invention.

The recovery plan and parallel recovery plan algorithms described above assume that only one storage device has failed. In other embodiments, the algorithms may be extended to take into account multiple failures. For instance, as shown in FIG. 7, a conditional recovery plan algorithm 700 may be implemented with determines all possible conditional recovery plans for a lost symbol given that other symbols also have been lost. In accordance with this algorithm, the generated lists of recovery plans (RPs) for a particular symbol s are considered (step 702). For each other symbol s' in each recovery plan in the list, those recovery plans that depend on symbol s' are filtered out to provide lists of recovery plans for symbol s that are conditioned on the loss of symbol s' (referred to as RP(s, s')) (steps 704, 706, 708). This algorithm 700 can be further extended to produce conditional lists of recovery plans conditioned on pairs, triples, etc. of other lost symbols. Using the enumerated conditional recovery plans, a conditional parallel recovery plan algorithm may be implemented which enumerates all possible conditional parallel recovery plans and determines the efficacy of each conditional parallel recovery plan based on one or more selected metrics, such as parallelism and/or load.

Figure 8:
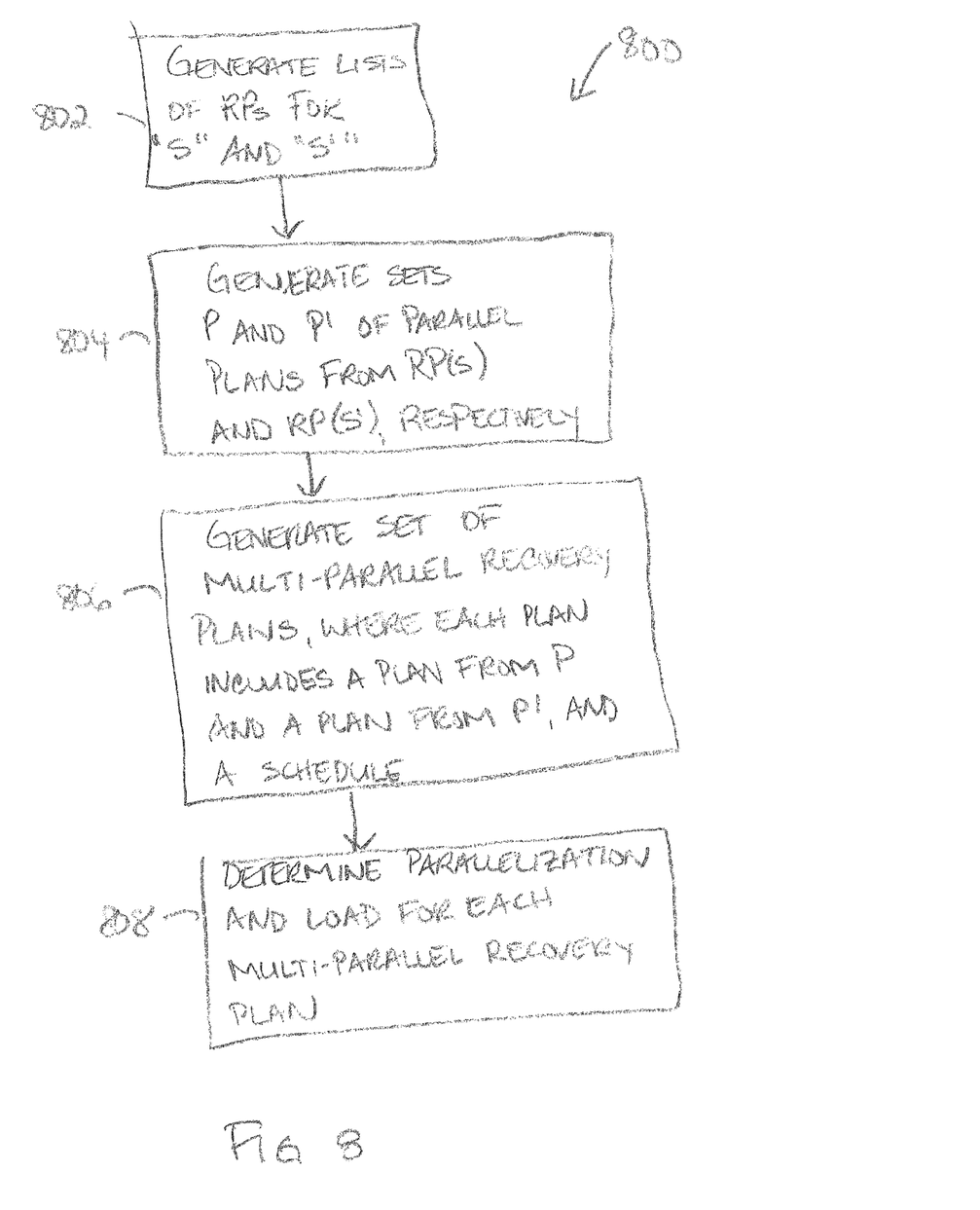
FIG. 8 is a flow diagram of a technique for generating a multi-parallel recovery plan for multiple symbols in an erasure code, in accordance with an exemplary embodiment of the invention.

The recovery plan and parallel recovery plan algorithms described above also may be extended to implement a multi-parallel recovery plan algorithm 800 that determines all possible multi-parallel recovery plans (i.e., plans which recover multiple lost symbols concurrently according to some schedule) and determines the efficacy of each multi-parallel recovery plan based on one or more selected metrics (e.g., most parallel, least load, or a combination thereof). For instance, with reference to FIG. 8, recovery plan lists are generated for symbols s and s' (step 802), and sets P and P' of parallel plans p and p' are generated from the respective recovery plan lists (step 804). Then, given two lost symbols, s and s', the multi-parallel recovery plan 800 considers together the set P of parallel recovery plans for symbol s and the set P' of parallel recovery plans for symbol s'. From those sets, the algorithm 800 then determines a set of all possible multi-parallel recovery plans and a schedule for running the plans (step 806). A schedule is a list of pairings of recovery plans for symbol s and recovery plans for symbol s' such that each recovery plan from the union of parallel plans p and p' occurs exactly once. If parallel plans p and p' have a different number of recovery plans, then some pairings of recovery plans will contain only a single recovery plan (i.e., plans from the longer of parallel plans p and p'). Performance metrics, such as speedup and load, may then be determined for each multi-parallel recovery plan (step 808). In one embodiment, the most efficient multi-parallel recovery plans may be determined by examining all recovery plans in p and p' and identifying those recovery plans that have the most number of symbols in common. For the multi-parallel recovery plans, speedup is the sum of speedups over all lost symbols. The load is a function of schedule. For instance, given a pair of recovery plans (one from p and one from p'), scheduled together, symbols that occur in both recovery plans are counted only once. Thus, the multi-parallel recovery plans with the least load are those combinations of plans that have the most number of symbols in common.

The multi-parallel plan can be implemented with any number of lost symbols. In addition, the techniques described above for reducing the number of parallel plans evaluated using the parallel recovery plan algorithm also apply to the multi-parallel recovery plan algorithm.

It should be understood that the parallel recovery plan techniques described herein are applicable to both static and rotated codes. For rotated codes, rather than identify a single parallel recovery plan for the entire storage device, parallel recovery plans are selected for each set of strips for the storage device(s) in accordance with the manner in which the erasure code's symbols are rotated on the device(s).

Instructions of software described above (including the recovery plan algorithm, the parallel recovery plan algorithm, the conditional recovery plan algorithm, the conditional parallel recovery plan algorithm, and the multi-parallel recovery plan algorithm described above and illustrated in part in Table 1 and FIGS. 4, 5, 7 and 8) are loaded for execution on a processor (such as one or more CPUs 114-118 in FIG. 1). The processor may include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data, data structures, and instructions (of the software) are stored in respective storage devices, which are implemented as one or more computer-readable or computer-usable storage media (such as one or more memories 120-124 in FIG. 1). The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the data, data structures and instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

The algorithms described herein may be implemented as a standalone tool for evaluating parallel recovery plans for various codes implemented on various storage systems. Other uses of the algorithms also are envisioned, such as embedding the algorithms as a management tool in a storage system (such as system 100) to periodically identify parallel recovery plans for one or more lost symbols, and/or provide for the evaluation of parallel recovery plans in a real-time manner (e.g., so that the balance between speedup and load can change dynamically by identifying different parallel recovery plans).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method of identifying a parallel recovery plan for a data storage system, comprising:
   identifying base recovery plans for symbols of an erasure code implemented across a plurality of storage devices in a data storage system;
   generating a list of first recovery plans for a first symbol based on the base recovery plans;
   combining selected first recovery plans from the list to generate a set of parallel recovery plans to reconstruct a failed storage device; and
   evaluating the set of parallel recovery plans based on a performance metric to identify a preferred parallel recovery plan to reconstruct the failed storage device.

2. The method as recited in claim 1, further comprising: providing a structure of the erasure code, wherein identification of the base recovery plans is based on the provided structure.

3. The method as recited in claim 1, wherein generating the list of recovery plans comprises:
   providing a first base recovery plan for a first symbol;
   identifying a second symbol of the erasure code in the first base recovery plan;
   substituting a second base recovery plan associated with the second symbol for the second symbol in the first base recovery plan to generate a recovery plan; and
   adding the recovery plan to the list of recovery plans.

4. The method as recited in claim 1, wherein the performance metric is maximum speedup with minimal load.

5. The method as recited in claim 1, wherein the recovery plans for the first symbol are conditioned on loss of other symbols of the erasure code.

6. The method as recited in claim 1, further comprising:
   generating a list of recovery plans for a second symbol of the erasure code; and
   combining selected recovery plans for the first symbol with selected recovery plans for the second symbol to generate multi-parallel recovery plans, wherein a multi-parallel recovery plan includes a selected recovery plan for the first symbol and a selected recovery plan for the second symbol.

7. A method of generating a list of recovery plans for a symbol of an erasure code, comprising:
   providing a structure of an erasure code having a plurality of symbols implemented across a plurality of storage devices;
   generating base recovery plans for the symbols based on the structure; and
   for each base recovery plan for a first symbol,
      identifying a second symbol in the base recovery plan;
      identifying a second base recovery plan for the second symbol that does not depend on the first symbol;
      substituting the second base recovery plan for the second symbol in the base recovery plan for the first symbol to generate a recovery plan; and
      adding the recovery plan to a list of recovery plans.

8. The method as recited in claim 7, further comprising conditioning the recovery plans for the first symbol on loss of another symbol of the erasure code.

9. The method as recited in claim 7, wherein the symbols comprise data symbols and parity symbols, and wherein generating the base recovery plans for a data symbol comprises identifying odd sets of parity symbols connected to the data symbol.

10. The method as recited in claim 9, wherein the structure is one of a Tanner graph and a generator matrix.

11. A method of selecting a parallel recovery plan to reconstruct a failed data storage device, comprising:
   generating a list of recovery plans for a symbol of an erasure code having a plurality of symbols implemented across a plurality of storage devices;
   combining recovery plans from the list to generate a set of parallel recovery plans to reconstruct a failed storage device;
   filtering from the set of parallel recovery plans those parallel recovery plans that exceed a bottleneck bound; and
   evaluating the filtered set of parallel recovery plans to identify a preferred parallel recovery plan to reconstruct a failed storage device.

12. The method as recited in claim 11, wherein generating a list of recovery plans comprises:
   identifying base recovery plans;
   generating recovery plans based on the base recovery plans; and
   filtering, from the list, any recovery plan having a number of symbols that exceeds a predefined threshold.

13. The method as recited in claim 11, wherein the filtered set of parallel recovery plans is evaluated based on at least one of speedup and load to identify a preferred parallel recovery plan.

14. The method as recited in claim 11, wherein the erasure code is an XOR-based erasure code.

* * * * *